DISCONNECTABLE PULSE GENERATOR

Filed Sept. 20, 1967 2 Sheets-Sheet 1

INVENTOR
ERNST KUTSCHBACH

Aug. 12, 1969 E. KUTSCHBACH 3,461,404

DISCONNECTABLE PULSE GENERATOR

Filed Sept. 20, 1967 2 Sheets-Sheet 2

INVENTOR
ERNST KUTSCHBACH

United States Patent Office 3,461,404
Patented Aug. 12, 1969

3,461,404

DISCONNECTABLE PULSE GENERATOR

Ernst Kutschbach, Karl Marx-Stadt, Germany, assignor to VEB Buchungsmaschinenwerk Karl Marx-Stadt, Karl Marx-Stadt, Germany Filed Sept. 20, 1967, Ser. No. 669,154
Int. Cl. H03k 3/26
U.S. Cl. 331—111 10 Claims

ABSTRACT OF THE DISCLOSURE

A pulse generator disconnectable by a voltage applied to its input, comprises a Schmitt trigger; a feedback path including a negator circuit, an "and" gate and an "or" gate. A delay line is connected to the Schmitt trigger input to delay the feedback signal; and a pulse generation control path including another "and" gate with a number of inputs and the "or" gate is connected to the input of the Schmitt trigger.

Background of the invention

This invention relates to a disconnectable pulse generator and more particularly, to a generator which, when in a disconnected state, produces a fixed output signal and, when switched on, after a definite build-up period, generates a series of pulses.

There has been developed a great variety of circuits for the generation of pulses which are well known to those skilled in the art, such as multivibrators, blocking oscillators, square wave generators and the like.

A circuit is described in German patent application, DAS, 1,174,840, which is adapted to generate pulses which are used for electronic counting. This pulse generating circuit, however, can be switched off only when one stage of this circuit has been blocked.

The known multivibrators have the shortcoming that the generation of pulses with variable pulse rates is possible only within a fixed small range of frequencies, by means of changing the bias voltage.

Summary of the invention

It is an object of this invention to provide a switched generator which at asynchronous operation requires no separate structural stages for synchronization and is suitable for generation of different pulse frequencies.

According to the present invention, the above object is attained so that for the generation of pulses, a Schmitt trigger is employed. The output signal from the second stage of the Schmitt trigger is applied via a negator and via a combination of two diodes and a resistor, working as an "and" or "or" gate to the input of the Schmitt trigger, and at the input of the Schmitt trigger a capacitor is arranged to delay the signals applied back and, consequently, to act as a frequency determining element. The "and" and "or" gates, comprising two diodes and one resistor, are connected to the input of the Schmitt trigger by means of which the pulse generator is then switched off when a signal L, approximately equal to the supply voltage is applied to all inputs of the "and" gate.

Another feature of this invention is the fact, that to switch off the pulses, a second input is provided at the "and" gate connected in the feedback path, by means of which the generation of pulses can be switched off if the signal O is applied to the second input.

A further feature of this invention is a delay line provided before the Schmitt trigger, to delay the feedback voltage.

Moreover, there are a number of feedback paths with different capacitors arranged within the circuit which are connected via a further "or" gate consisting of diodes, to the input of the Schmitt trigger.

Brief description of the drawings

The invention will now be described by way of example with reference to the accompanying drawings, wherein.

Description of the preferred embodiments

Figure 1:
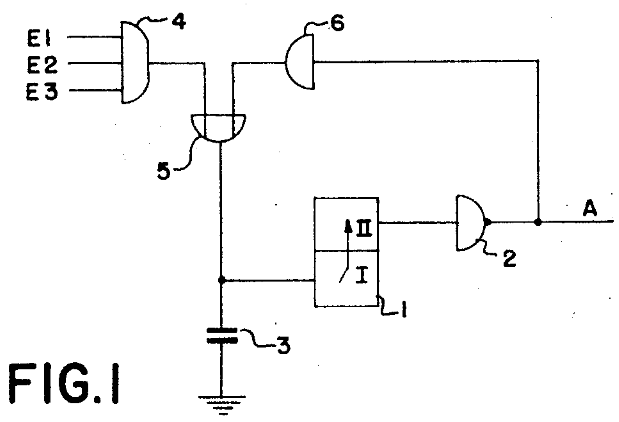
FIG. 1 shows a block diagram of the logic system of the pulse generator according to this invention.
Figure 2:
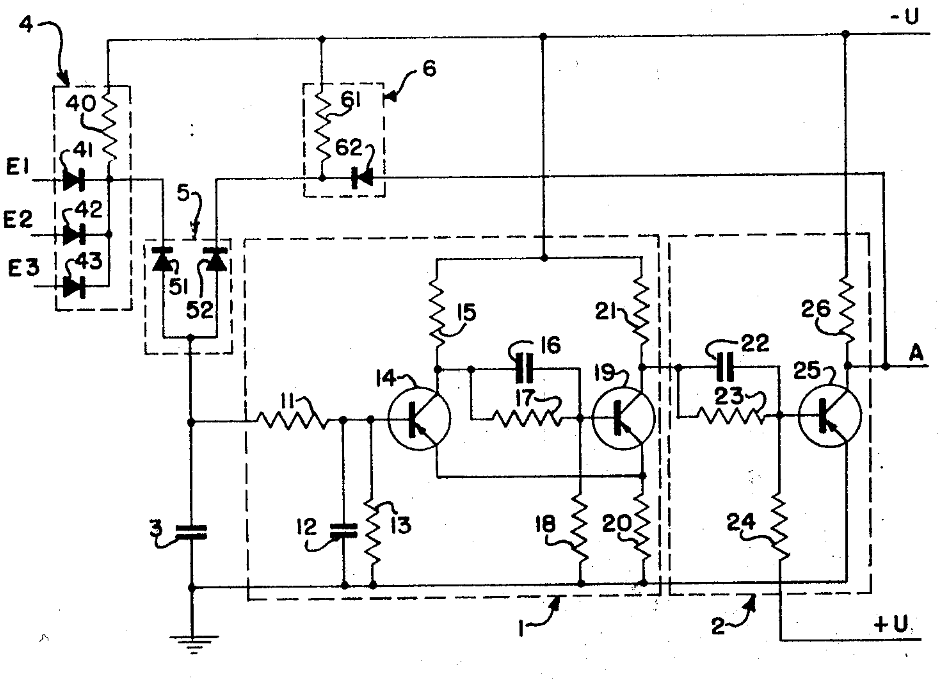
FIG. 2 shows a schematic diagram of the pulse generator according to FIG. 1.

The circuit configuration and the mode of operation of the pulse generator according to this invention will first be described with reference to FIGS. 1 and 2, wherein the shown embodiment comprises principally a Schmitt trigger 1. The output of the Schmitt trigger 1 is connected to the generator output A by means of a negator circuit 2, a feedback path having an "and" gate 6 connected to one input of an "or" gate 5, the output of the "or" gate 5 being connected to the input of the Schmitt trigger 1. A capacitor 3 is coupled between the input of the Schmitt trigger and the ground, and a switching off "and" gate 4 comprising inputs E1, E2 and E3. The output of "and" gate 4 is connected to the second input of the "or" gate 5.

If a signal O is applied to at least one of the inputs E1, E2 or E3, the output voltage of the "and" gate 4 is O, since the total voltage across the load resistor 40 (FIG. 2) connected to the "and" gate 4 falls off. If, in this instance, the capacitor 3 is still charged, the first stage I of the Schmitt trigger 1 will be conductive and the second stage II will be cut off. Consequently, an input voltage L is applied to the subsequent negator circuit 2, whose output voltage at the output A will be O. Due to this condition, the voltage O is also applied to an "and" gate 6 having a diode 62 in the feedback path. "And" gate 6 transfers the O output voltage and the capacitor 3 is discharged through the voltage divider 11, 13 at the input of the Schmitt trigger 1.

When the capacitor 3 is discharged to the extent that the lower threshold value of the Schmitt trigger is reached, then the Schmitt trigger switches over and the signal I appears at the output A. Now, the "and" gate 6, connected in the feedback path, is no longer kept at O, and the capacitor 3 becomes charged once again through the voltage divider consisting of a resistor 61 of the "and" gate 6, a diode 52 within the "or" gate 5, and the input voltage divider 11, 13 of the Schmitt trigger 1.

If the charging action of the capacitor 3 has advanced up to the upper threshold of the Schmitt trigger, then the latter switches over again and the discharging process of capacitor 3 starts anew.

Due to the action of the diodes incorporated both in the "and" gate 6 and in "or" gate 5 of the feedback path, as well as in the switching off "and" gate 4, there is no feedback from the delay capacitor 3 to the respective inputs E1, E2 and E3.

If, by means of a definite L or O value of the output pulses, the condition is achieved in one circuit driven by said pulses, at which the pulses are to be switched off, then all of the inputs E1, E2 and E3 of the "and" gate 4 must be connected to L. Therefore, the voltage at the input of the Schmitt trigger 1 which is necessary for producing the output signal O, will be retained.

When the switching on condition has been restored, the process begins again according to the above described manner.

By means of suitable values of the load resistors in the "and" gate and of the voltage divider in the Schmitt trigger, it is possible to optionally generate symmetrical or asymmetrical pulses. The capacitor 12, provided in the base circuit of the first transistor 14 in the Schmitt trigger, serves to improve the shape of the generated pulses.

It is possible to derive the feedback voltage also at the collector of the first transistor 14 of the Schmitt trigger. However, at this connection point no accurate square pulses having a well defined L and O signals arise because the first transistor 14, until attaining the threshold value, is always slightly over controlled. Consequently, this circuit may be employed only by using a special dimensioning and if there are less rigorous requirements for the stability of the pulse frequency.

The pulse generator according to this invention is particularly advantageous in the case when preadjusted counters are to continue the counting process up to a specific fixed value, or when preadjusted bistable trigger stages are to be reset in a definite sequence to their initial condition. The L signals belonging to the respective terminal conditions are then connected to the inputs E1, E2 and E3 of the "and" gate 4 which are employed for the switching off function.

Figure 3:
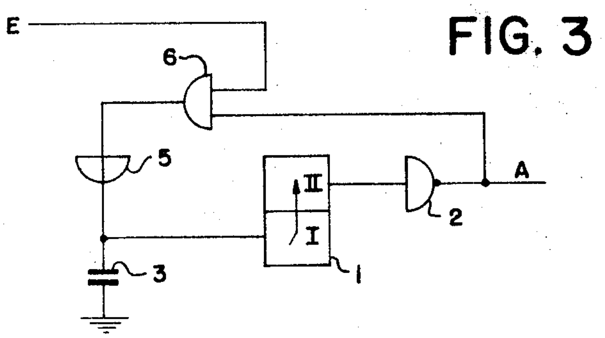
FIG. 3 is a block diagram of a modification of the logic structure of the pulse generator.

FIG. 3 shows a pulse generator in accordance with the present invention having a modified switching off function. The feedback circuit for the pulse generation corresponds substantially to that of FIG. 1. The switching off action of the pulse generator is effected by means of a second input E provided in the "and" gate which is connected in the feedback path.

If an input signal O is applied to the control input E, the output of the "and" gate 6, irrespective of the output signal, remains an O. As a result, the input of the Schmitt trigger also becomes O, the same voltage arises on the collector of the second transistor of the Schmitt trigger and at the output of the negator 2, a signal L approximately equal to the power supply voltage L1, results.

At the aforementioned switching condition the pulse generator is switched off and holds in this position until the controlling signal L is applied to the control input E. At this point the pulse generation is initiated.

It is also possible to extend the circuit in this manner so that several inputs are arranged at the "and" gate for controlling the pulse generator. In this case the pulses are only then generated if all input leads conduct the signal L.

Figure 4:
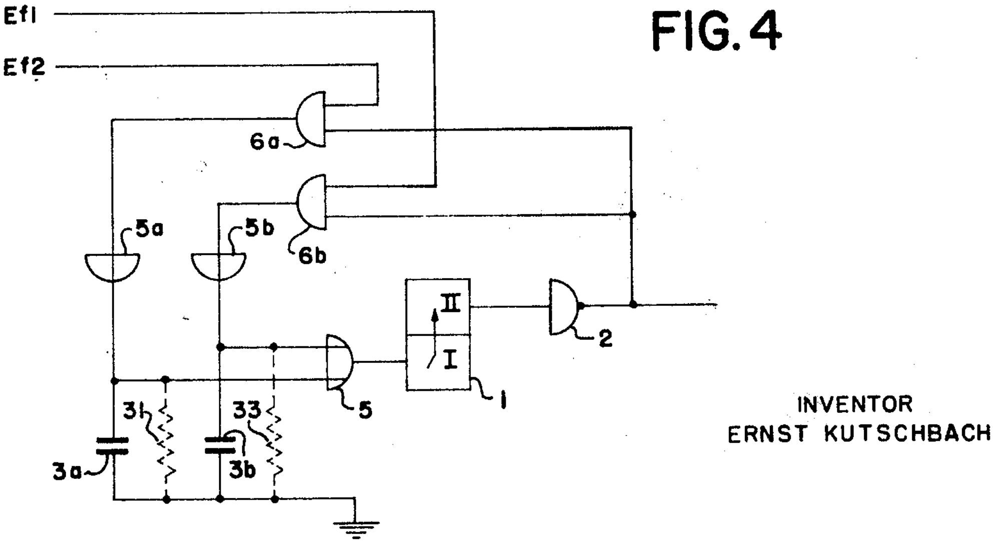
FIG. 4 is a block diagram of the logic structure of a pulse generator which is able to generate two different pulse frequencies.

In FIG. 4, a pulse generator for generating two distinct frequencies is illustrated. The block diagram itself corresponds principally to the arrangement as shown in FIG. 3. There are provided two feedback paths which include different capacitors 3*a* and 3*b*. The voltages from both capacitors are applied through an "or" gate 5 to the Schmitt trigger 1.

If the potential on both input leads E*f*1 and E*f*2 is O, the Schmitt trigger 1 consequently also receives the input signal O and, at the output A of negator 2, a signal L results. If the signal L is applied to one of the inputs of 6*a* or 6*b*, the connected capacitor will become charged and this voltage is applied to the Schmitt trigger 1, whereas the remaining capacitor is kept discharged.

In accordance with the delay time which is proportional to the magnitude of the capacitors, the required pulse frequency is generated.

Should the second condenser which is associated with the second frequency be charged through the blocking resistances of the diodes, a high discharge resistor 31 or 33 may be connected in parallel to each capacitor 3*a* and 3*b* respectively. By this means the build up time for the second frequency is independent of the switching period of the first frequency.

It is a very favorable feature of the circuit of FIG. 4 that there are almost no limits to the choice of frequencies, so that in one connection a high-low frequency and in another connection, a very low pulse frequency may be generated. This circuit may be extended by the addition of additional feedback paths, by means of which it is possible to switch arbitrarily a greater number of frequencies.

This invention has been described with reference to certain preferred embodiments thereof, variations and modifications, however, can be effected within the spirit and the scope of the invention as defined in the appended claims.

What is claimed is:

1. A disconnectable pulse generator comprising a Schmitt trigger; a negator interconnected between the output of said Schmitt trigger and the output of the generator; a first "and" gate and "or" gate combination interconnected between the output of said negator and the input of said Schmitt trigger to provide a feedback path; at least one capacitor connected to the input of said Schmitt trigger to delay the feedback signals; and a second "and" gate and "or" gate combination interconnected between the input means of the generator and the input of said Schmitt trigger to disconnect the generation of pulses.

2. The pulse generator according to claim 1, wherein said first and second "and" gate and "or" gate combination comprises at least two diodes connected in opposition one to another and a resistor connected to the generator supply voltage, respectively.

3. The pulse generator according to claim 2, wherein said Schmitt trigger input comprises a voltage divider.

4. The pulse generator according to claim 1, wherein said Schmitt trigger comprises first and second transistor stages.

5. The pulse generator according to claim 4, wherein said negator is connected to the first stage output of said Schmitt trigger.

6. The pulse generator according to claim 1, wherein the "and" gate in said second combination comprises a plurality of inputs.

7. The pulse generator according to claim 1, wherein the "and" gate in the first combination comprises a second input to disconnect the generation of pulses.

8. The pulse generator according to claim 1 comprising a delay line connected to the Schmitt trigger input for delaying the feedback voltage.

9. The pulse generator according to claim 7, comprising a plurality of said first combinations, each said first combination being provided with a capacitor each said capacitor having a different value and being connected to the input of the Schmitt trigger via a further "or" gate consisting of diodes.

10. The pulse generator according to claim 9, wherein each capacitor is bridged by a resistor of high value.

References Cited

UNITED STATES PATENTS 3,376,518 4/1968 Emmer ____________ 331—111

JOHN KOMINSKI, Primary Examiner

U.S. Cl. X.R.

307—218, 290; 331—153